US009742962B2

(12) United States Patent
Shibuya

(10) Patent No.: US 9,742,962 B2
(45) Date of Patent: Aug. 22, 2017

(54) IMAGE PROCESSING APPARATUS, METHOD, AND RECORDING MEDIUM STORING IMAGE PROCESSING PROGRAM FOR GRADATION CORRECTION TO MINIMIZE THE DIFFERENCE BETWEEN THE CORRECTED COLORIMETRIC VALUE AND A COLORIMETRIC MEASURED COLOR VALUE

(71) Applicant: Takeshi Shibuya, Kanagawa (JP)

(72) Inventor: Takeshi Shibuya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 26 days.

(21) Appl. No.: 14/525,858

(22) Filed: Oct. 28, 2014

(65) Prior Publication Data
US 2015/0116779 A1 Apr. 30, 2015

(30) Foreign Application Priority Data

Oct. 29, 2013 (JP) .................................. 2013-224751
Apr. 8, 2014 (JP) .................................. 2014-079706

(51) Int. Cl.
*G06K 15/00* (2006.01)
*H04N 1/40* (2006.01)
*H04N 1/60* (2006.01)

(52) U.S. Cl.
CPC ......... *H04N 1/6047* (2013.01); *H04N 1/6036* (2013.01)

(58) Field of Classification Search
None
See application file for complete search history.

(56) References Cited

U.S. PATENT DOCUMENTS 5,321,970 A * 6/1994 Davies ................. G01N 21/274
250/252.1
7,111,784 B2 * 9/2006 Nakayama ............... 235/462.04
(Continued)

FOREIGN PATENT DOCUMENTS

JP 10-112799 4/1998
JP 2000-278547 10/2000
(Continued)

*Primary Examiner* — Vincent Rudolph
*Assistant Examiner* — Michael Burleson
(74) *Attorney, Agent, or Firm* — Harness, Dickey & Pierce P.L.C.

(57) ABSTRACT

An image processing apparatus, an image processing method, and an image processing program stored in a recording medium are provided. The image processing apparatus includes a processing circuitry, and the processing circuitry and the image processing method obtain a color image output from an image forming unit, predict an output color of the image forming unit to generate a predicted color specification value independent from the image forming unit, extract from the input image data a colorimetry area for color difference determination, obtain a colorimetric value of an area of the color image that corresponds to the extracted colorimetry area, using a colorimeter, and add a colorimetric error at the colorimeter due to a color arrangement on the input image data to the predicted color specification value, to obtain a corrected colorimetric value of the area of the color image.

17 Claims, 6 Drawing Sheets

(56) References Cited

U.S. PATENT DOCUMENTS

| | | | |
|---|---|---|---|
| 8,797,589 B2* | 8/2014 | Dalal | H04N 1/6033 358/1.18 |
| 2011/0063697 A1* | 3/2011 | Shibuya | 358/505 |
| 2012/0206745 A1 | 8/2012 | Shibuya | |
| 2013/0207996 A1 | 8/2013 | Shibuya | |

FOREIGN PATENT DOCUMENTS

| | | | |
|---|---|---|---|
| JP | 2005-153165 | | 6/2005 |
| JP | 2007-324862 | * | 12/2007 |
| JP | 2010-213012 | | 9/2010 |
| JP | 2011-078007 | | 4/2011 |
| JP | 2012-070360 | | 4/2012 |

* cited by examiner

IMAGE PROCESSING APPARATUS, METHOD, AND RECORDING MEDIUM STORING IMAGE PROCESSING PROGRAM FOR GRADATION CORRECTION TO MINIMIZE THE DIFFERENCE BETWEEN THE CORRECTED COLORIMETRIC VALUE AND A COLORIMETRIC MEASURED COLOR VALUE

CROSS-REFERENCE TO RELATED APPLICATIONS

This patent application is based on and claims priority pursuant to 35 U.S.C. §119(a) to Japanese Patent Application Nos. 2013-224751 and 2014-079706, filed on Oct. 29, 2013, and Apr. 8, 2014, respectively, in the Japan Patent Office, the entire disclosure of which is hereby incorporated by reference herein.

BACKGROUND

Technical Field

Example embodiments of the present invention generally relate to an image processing apparatus, image processing method, and an image processing program stored in a recording medium.

Background Art

In digital printing apparatuses of electrophotography or ink-jet printing, stability in color output is demanded when hundreds or thousands of outputs are continuously performed. In particular, color reproduction needs to be stably managed in a case where similar documents with small changes in contents per a couple of pages are continuously printed or in a case where printing is performed concurrently at different sites.

However, compared with full-scale commercial printing, an operating environment in which digital document printers are used is not always strictly managed. Moreover, loads caused by printing of various types of documents in a mixed manner are significant, and the amount of the supplied toner or ink or the state of devices changes from moment to moment.

For this reason, in order to achieve stable management of color reproduction with a certain level strictness, it is necessary to stop the machines and perform calibration on a periodical basis.

On the other hand, the data given by a customer includes printing characteristic data of an output device, called color profiles, and colors to be reproduced by device-specific RGB (red, green, blue) image data or CMYK (cyan, magenta, yellow, black) image data are often defined by those color profiles.

Each of the color profiles is adjusted depending on the state of device, the type of used media, and the purpose of printing.

Generally, a spectrophotometric colorimeter or RGB scanner is used as a colorimeter device that measures the color of an output image.

SUMMARY

Embodiments of the present invention described herein provide an improved image processing apparatus, image processing method, and an image processing program stored in a recording medium. The image processing apparatus includes a processing circuitry, and the processing circuitry and the image processing method obtain a color image output from an image forming unit, the color image being formed by superimposing two or more basic colors on top of one another based on input image data, correct gradation characteristics of the two or more basic colors to be used by the image forming unit based on a gradation correction parameter, predict an output color of the image forming unit to generate a predicted color specification value independent from the image forming unit, extract from the input image data a colorimetry area for color difference determination, obtain a colorimetric value of an area of the color image that corresponds to the extracted colorimetry area, using a colorimeter, and add a colorimetric error at the colorimeter due to a color arrangement on the input image data to the predicted color specification value, to obtain a corrected colorimetric value of the area of the color image, wherein the processing circuitry corrects the gradation correction parameter to minimize, according to a prescribed function, a difference for at least a portion of the colorimetry area between the corrected colorimetric value and a color specification value obtained using the colorimeter.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
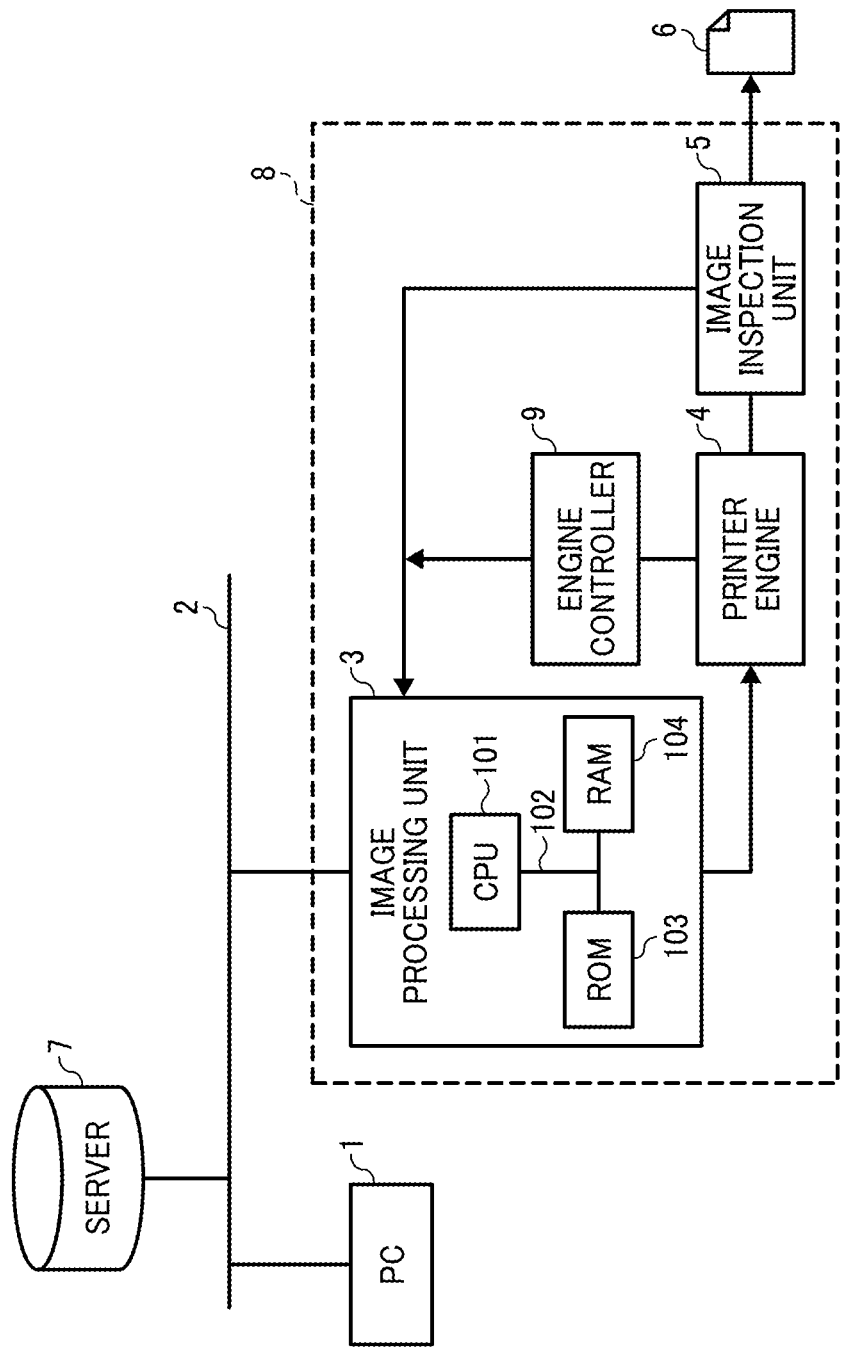
FIG. 1 is a schematic diagram illustrating the configuration of an image processing apparatus according to a first example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

<First Embodiment>

An image processing apparatus according to a first example embodiment of the present invention is described below with reference to the accompanying drawings. However, no limitation is indicated therein, and various applications and modifications may be made without departing from the scope of the invention. In the drawings, like reference signs denote like elements, and overlapping description may be simplified or omitted as appropriate.

Schematically, an image processing apparatus according to the present example embodiment includes an image forming unit that forms a color image on a recording medium by superimposing two or more basic colors on top of one another based on the input image data. The image processing apparatus according to the present example embodiment feeds gradation characteristics back to an image output device such as an image forming unit so as to make the predicted color of printing appear close to a target color of image forming. Accordingly, the target color defined by a color profile is effectively achieved.

An outline of the configuration of an image processing apparatus according to an example embodiment of the present invention is described below with reference to FIG. 1. FIG. 1 is a schematic block diagram illustrating a system configuration including an image processing apparatus according to an example embodiment of the present invention.

An image processing apparatus 8 according to an example embodiment of the present invention includes an image processing unit 3, a printer engine 4, an engine controller 9, and an image inspection unit 5. The image processing unit 3 develops and processes the image data of document data input through a network 2. The printer engine 4 is an image forming unit of electrophotography that actually performs printing. The engine controller 9 controls the printer engine 4. The image inspection unit 5 performs in-line inspection on an output image 6 output by the printer engine 4.

In the present example embodiment, the image processing unit 3 and the printer engine 4 are integrated into the image processing apparatus 8. However, no limitation is indicated therein. For example, the image processing unit 3 may be configured by software that operates in cooperation with an expansion board provided for a PC, which is detached from the printer engine 4. Note that the image processing unit 3 may include a detached user interface.

The image inspection unit 5 is configured by an RGB (red, green, blue) line sensor and a scanner 27. The scanner 27 serves as a colorimeter capable of analyzing a color of image on a surface of paper conveying mechanism. A spectrophotometric colorimeter may be used as the colorimeter.

Moreover, a personal computer (PC) 1 and a server 7 are connected through the network 2, and they configure a system according to the present example embodiment illustrated in FIG. 1. The PC 1 transmits document data and printing request to the image processing apparatus 8, and the server 7 stores the data to be used by the image processing unit 3 to perform color conversion.

Normally, the document data whose printing is requested by the PC 1 is sent to the image processing unit 3 in a complex data format including the drawing instructions for texts, and drawings, and bitmap data defined by RGB or CMYK. The image processing unit 3 performs various kinds of image processing including deployment of drawing instructions and color processing on the document data, and converts the data into a signal compatible with the printer engine 4. Finally, the printer engine 4 forms an image on paper, based on the signal output from the image processing unit 3.

The image processing unit 3 of the image processing apparatus 8 includes a central processing unit (CPU) 101 that performs various computations and drive control of the units in the image processing apparatus 8, a read only memory (ROM) 103 that stores various data such as computer program instructions, and a random access memory (RAM) 104 that stores various data in a rewritable manner to serve as a working area of the CPU 101, which are connected via a bus 102.

Next, an outline of image data processing, including printing as a last step, according to the present example embodiment of the present invention, is described below with reference to FIG. 2. It is assumed that a document given by a user is image data including RGB or CMYK printing device characteristics, such as "Japan Color 2001 Coated".

Figure 2:
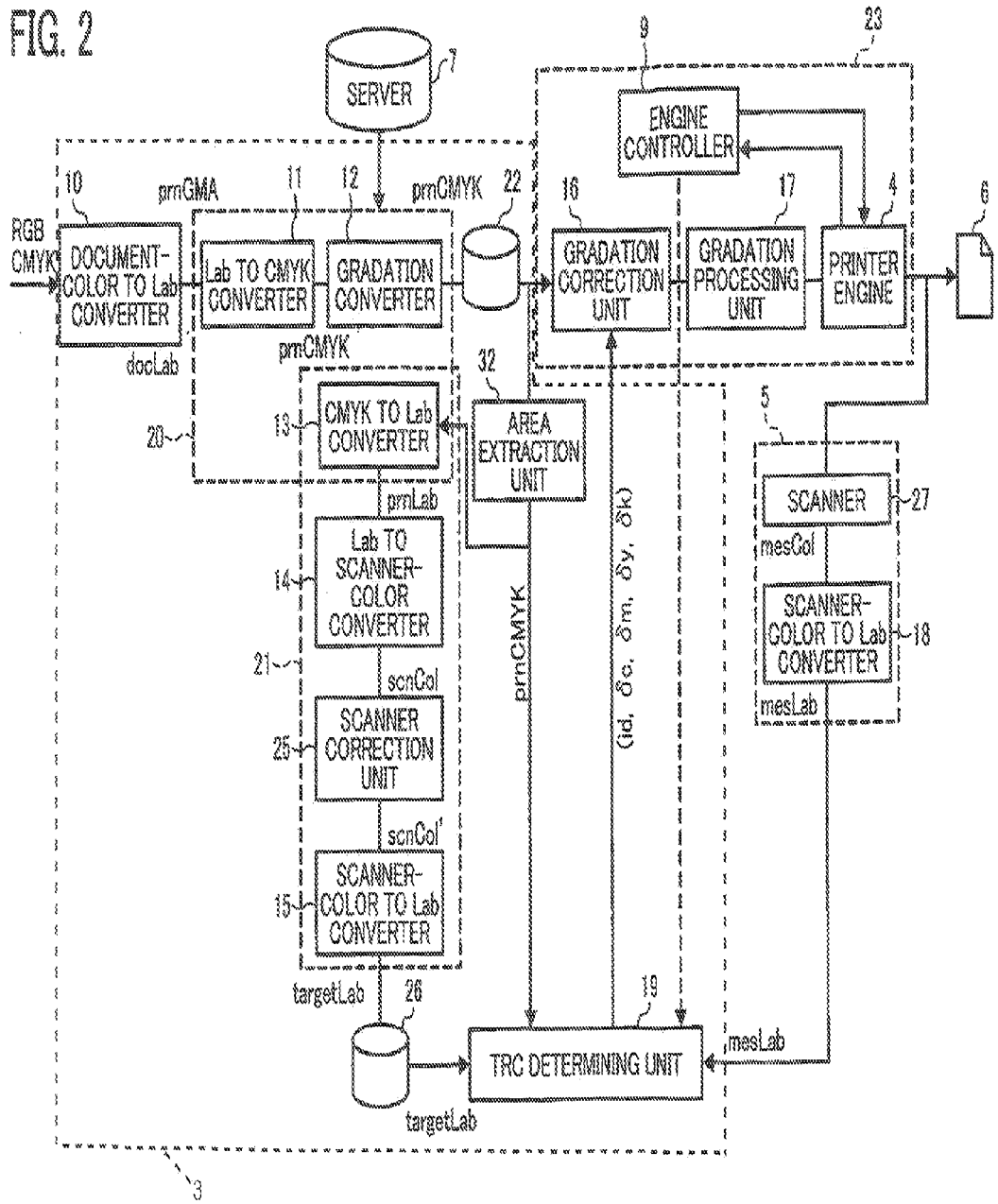
FIG. 2 is a schematic diagram illustrating the flow of image data processing according to a first example embodiment of the present invention.

A document-color to Lab converter 10, a Lab to CMYK converter 11, a CMYK to Lab converter 13, scanner-color to Lab converters 15 and 18, and a Lab to scanner-color converter 14, as illustrated in FIG. 2, refers to basic data called color profile to perform color space conversion. Moreover, an area extraction unit 32 as illustrated in FIG. 2, which serves as an extraction unit, refers to an image that is color-converted based on a color profile to extract from the input image data a colorimetry area suitable for color difference determination. As such a color profile, for example, the international color consortium (ICC) is widely known.

Firstly, an outline of the processing blocks performed by the image processing apparatus 8 according to the present example embodiment of the present invention is described. In the present example embodiment, the Lab to CMYK converter 11 serves as a color space conversion unit that associates the color space of the input image data with the basic color space of the printer engine 4 that serves as an image forming unit. The CMYK to Lab converter 13 serves as a color prediction unit that predicts the output colors of the printer engine 4 as prnLab being a color specification value that is not dependent on the printer engine 4.

In the present example embodiment, the scanner-color to Lab converters 15 and 18 serve as colorimetric value converters that convert a color specification value for the scanner 27 or the like into a color specification value that is not dependent on the printer engine 4. By contrast, the Lab to scanner-color converter 14 serves as a colorimetric value inverter that inverts a color specification value that is not dependent on the printer engine 4 to obtain a color specification value for the scanner 27 or the like.

The scanner-color to Lab converter 15 converts the color specification value for the scanner 27 or the like that is generated by the Lab to scanner-color converter 14 and then is corrected by the scanner correction unit 25 into a color specification value again that is not dependent on the printer engine 4.

A memory 22 is a colorimetry area holding unit that holds the CMYK image data extracted by referring to an image that is color-converted based on a color profile. The scanner 27 is a colorimeter that measures the colorimetric value of the image formed on a recording medium, in accordance with the CMYK image data held as a colorimetry area by the memory 22.

A gradation correction unit 16 serves as a gradation correction unit that corrects the gradation characteristics of two or more basic colors based on a gradation correction parameter. The gradation correction unit 16 includes a tone reproduction correction (TRC) table as described later.

The scanner correction unit 25 serves as a colorimetric error correction unit that corrects a colorimetric value by adding a colorimetric error made at the scanner 27 or the like due to the color arrangement on the input image data to the color specification value predicted by the CMYK to Lab converter 13. More specifically, the scanner correction unit 25 corrects a colorimetric value by adding a colorimetric error made at the scanner 27 or the like due to the color arrangement on the input image data to a color specification value for the scanner 27 or the like obtained as a result of the conversion performed by the Lab to scanner-color converter 14 on the color specification value predicted by the CMYK to Lab converter 13.

Further, the scanner correction unit 25 derives a colorimetric error made by the scanner 27 or the like depending on the level of the influence of the flare caused by the reflection of the light illuminated on a recording medium by the scanner 27 or the like. The scanner correction unit 25 derives a colorimetric error based on a function of the flare, e.g., a fuzzy function as will be described later, and includes the derived colorimetric error in a color specification value for the scanner 27 or the like. Accordingly, the color specification value is corrected.

The gradation correction unit 16 corrects a gradation correction parameter so as to minimize according to a prescribed function an error between targetLab and scnCol' regarding at least some of the CMYK image data stored in the memory 22. Here, targetLab is a color specification value obtained by converting the colorimetric value obtained by the scanner 27 or the like into a color specification value that is not dependent on the printer engine 4, and scnCol' is a colorimetric value obtained as a result of correction performed by the scanner correction unit 25 on the prnLab predicted by the CMYK to Lab converter 13.

In the color profile described above, the color profile used by the document-color to Lab converter 10 is attached to the document data or is prepared in advance as a default. The color profile used by the scanner-color to Lab converters 15 and 18 and the Lab to scanner-color converter 14 is set to the image processing unit 3 and the image inspection unit 5 in advance in a fixed manner.

By contrast, the color profile used by the Lab to CMYK converter 11 and the CMYK to Lab converter 13 has varying color reproduction characteristics depending on the paper set to the printer engine 4. For this reason, the color profile appropriately selected prior to printing operation is downloaded from the server 7. Hereinafter, such a color profile may be referred to as paper profile. The paper profile is selected via the PC 1 or a user interface of the image processing unit 3.

Upon setting the color profiles as described above, firstly, the document-color to Lab converter 10 converts a user-given document expressed by RGB or CMYK into "docLab" as a Lab value, which is a color specification value that is not dependent on a device. The Lab to CMYK converter 11 converts "docLab" into an 8-bit digital value for each of the basic colors of the CMYK of the printer engine 4.

By default, a user gradation converter 12 outputs "prnCMYK" without changing the values of the CMYK. These color conversion processes as described above are performed concurrently with the development of vector data or fonts, and the resultant CMYK data is output as bit map data.

The image data of the CMYK bit map as developed above is stored in the memory 22 such as hard disk drive (HDD) in a unit of each document to be printed. The CMYK image data stored in the memory 22 is also used to detect a colorimetry area as will be described later.

An image forming part 23 forms an image on specified paper based on the CMYK bitmap image data. The gradation correction unit 16 as a gradation correction unit includes a tone reproduction correction (TRC) table for each of the CMYK, and corrects a value of each of the CMYK by using an associated one of these TRC tables.

A gradation processing unit 17 adopts pulse-surface-area modulation or error-diffusion method to reduce the levels of gradation of the 8-bit color value received for each of the CMYK colors, such that the printer engine 4 can express the color value in one dot. The printer engine 4 forms the output image 6 based on the CMYK signal whose the levels of gradation have been reduced by the gradation processing unit 17.

On the other hand, the "prnCMYK" input from the image forming part 23 as a CMYK value is returned to "prnLab" as a Lab value by the CMYK to Lab converter 13. The CMYK to Lab converter 13 reproduces the color of the output image 6 output by the image forming part 23 to simulate a Lab value.

The TRC determining unit 19 uses "prnLab" and "mesLab" to correct the TRC table provided for the gradation correction unit 16. Here, "prnLab" is simulated as a predicted output value, and "mesCol" is a measurement value of the output image 6 scanned by the image inspection unit 5. Moreover, "mesLab" is a colorimetric value obtained by converting "mesCol" by the scanner-color to Lab converter 18 into a Lab value.

When the scanner 27 provided for the image inspection unit 5 is an ordinary RGB scanner, an error due to flare may become a problem. For example, the light illuminating a document to be scanned is reflected and dispersed, and is included in the illumination light. This is considered to be a main cause of flare. Such an influence of flare may differ depending on the structure of the scanner or the place or direction where color is measured.

In the present example embodiment, the accuracy of predicting colors of an image read by a scanner is improved by adding to "prnLab" as a predicted output value a reading error that is unique to the scanner 27 and is caused due to an input image. By so doing, a measurement error dependent on the arrangement of colors in image data, in particular, a case in which the colors monitored by a colorimeter device deviate from the targeted predicted colors due to flare, can be avoided.

The scanner correction unit 25 receives "scnCol", which is a colorimetric value of scanner color space obtained by a colorimetric value inverter of the Lab to scanner-color converter 14 from a predicted output value of "prnLab", and queues the received "scnCol" so as to satisfy the required number of raster images. Then, the scanner correction unit 25 incorporates a blurriness function into "scnCol" to output "scnCol'" as a predicted value for the signal read by the scanner 27 from the output image 6. The blurriness function is described later in detail.

The scanner-color to Lab converter 15 that serves as a colorimetric value converter converts "scnCol'" as a predicted value for scanning into "targetLab" again as a predicted value for colorimetry. The "targetLab" is a Lab value and a color specification value that is not dependent on the device.

Due to the series of processes performed between the Lab to scanner-color converter 14 and the scanner-color to Lab converter 15 as described above, the saturation of readout colors that happens when the color gamut readable by the scanner 27 is smaller than the color gamut the printer engine 4 can output, i.e., color gamut compression, can be simulated.

In the present example embodiment, a colorimetric value prediction modeling unit 21 is configured by the CMYK to Lab converter 13, the Lab to scanner-color converter 14, and the scanner-color to Lab converter 15.

In order for the colorimetric value prediction modeling unit 21 to generate "targetLab" as a colorimetric value predicted by the colorimetric value prediction model 21, a heavy load is imposed to perform calculation. For example, a load is imposed on a memory and the time required to perform processing tends to be long. For this reason, in actuality, the data of pages to be used is prepared in advance in a memory 26, and the TRC determining unit 19 in a subsequent stage uses the predicted values for colorimetry that are stored in advance in the memory 26.

As described above, "targetLab" that serves as a predicted colorimetric value, which is a result of scanning including error characteristics of the scanner 27, is stored in advance. Accordingly, the TRC determining unit 19 in a subsequent stage can efficiently determine the amount of TRC in real time. Moreover, the color of printing "prnLab" simulated by a printer color gamut compressor 20 is converted into a target color "targetLab" to be measured by the image inspection unit 5.

The TRC determining unit 19 determines the amount of TRC "$\delta c, \delta m, \delta y, \delta k$" based on "targetLab" as a target color, "mesLab" that is a measurement value actually obtained from the image inspection unit 5, "prnCMYK" that is a value input to the gradation correction unit 16, and the control data sent from the engine controller 9. The amount of TRC is described later in detail.

Next, an outline of the configuration of the printer engine 4 as a laser printer according to the present example embodiment of the present invention is described with reference to FIG. 3.

Firstly, the configuration and operation of a developing unit 60$k$ is described. A photoreceptor drum 50$k$ rotates in the direction of arrow A. The rotational position of the photoreceptor drum 50$k$ is detected by a rotation detector 57 provided at an edge of the photoreceptor drum 57. In printing, a charging device 52 evenly charges the surface of the photoreceptor drum 50$k$ that has been cleaned by a cleaning roller 51.

Then, the surface of the photoreceptor drum 50$k$ is scanned by a laser beam 55 emitted from a laser unit 53 in accordance with a signal sent from an exposure controller 62. As a result, an electrostatic latent image is formed on the photoreceptor drum 50$k$. The scanning direction of the laser beam 55 in the above operation becomes the main-scanning direction, and the rotational direction A of the photoreceptor drum 50$k$ becomes the sub-scanning direction.

The electrostatic latent image formed as above is developed by a black (K) toner charged to the inverse potential supplied from the development roller 54, and becomes a toner image. The developed toner image is transferred onto an intermediate transfer belt 61.

In a similar manner to the developing unit 60$k$, developing units 60$c$, 60$m$, and 60$y$ also form toner images of cyan (c), magenta (m), and yellow (y), respectively, and transfer these toner images to the intermediate transfer belt 61 so as to be superimposed on top of one another. As a result, CMYK toner images are formed.

A transfer roller 58 transfers the entire CMYK toner images superposed on the intermediate transfer belt 61 onto paper conveyed from the right side along a paper conveyance path 59. A fixing device 56 fixes the toner image formed on the paper with heat and pressure.

Figure 4:
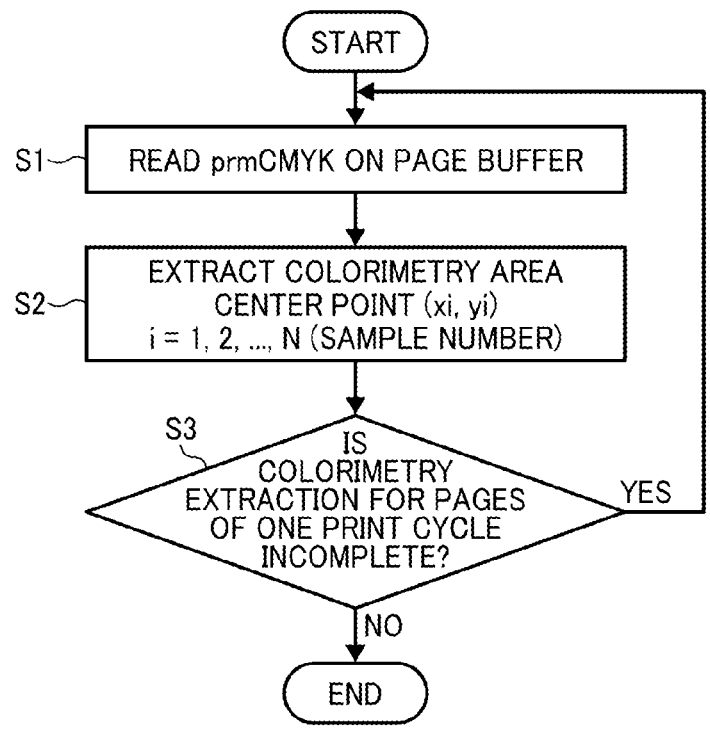
FIG. 4 is a flowchart illustrating the processes of extracting a colorimetry area according to a first example embodiment of the present invention.

Next, an algorithm for determining the amount of the correction to be performed by the TRC determining unit 19 according to the present example embodiment is described with reference to FIG. 4. FIG. 4 is a flowchart of the processes of extracting a colorimetry area of the CMYK-bitmapped to-be-printed document stored in a memory, prior to the processes of determining the amount of TRC "$\delta c, \delta m, \delta y, \delta k$" as described above, according to the present example embodiment of the present invention.

Firstly, the image forming part 23 reads the CMYK-bitmapped image data of one page of document data to be printed, into a page buffer from the memory 22 (step S1).

Next, a colorimetry area whose color is to be measured is extracted from the image data read into the page buffer (step S2). More specifically, a plurality of small areas of fixed high-flatness size, for example, 400 dpi, 41*41 pixels, are extracted. In this example, an extracted colorimetry area is indicated by the coordinates of the center of the pixels "$x_i, y_i$". Note that the subscript "i" is a sample number, and $x_i$, and $y_i$ indicate positions in the main-scanning direction and sub-scanning direction, respectively.

Note that the present embodiment aims at stable management of the color reproduction in printing where similar documents are repeatedly printed out. For this reason, a sample of the extracted colorimetry area may extend over a plurality of pages, which are a unit of pages to be printed out repeatedly. Accordingly, the sub-scanning coordinate $y_i$ indicates a continuous coordinate that includes the space among pages, where the number of pages to be printed out repeatedly is a unit and the beginning point on the first page is a point of origin.

When the image forming part 23 determines that colorimetry extraction for pages of one print cycle is incomplete ("YES" in step S3), steps S1 and S2 are repeated. When the image forming part 23 determines that colorimetry extraction for pages of one print cycle is complete ("NO" in step S3), the process is terminated.

Next, a method of determining the amount of TRC based on the colorimetric values of a colorimetry area $\{(x_i, y_i)\}$ (i=1, 2, ... N) is described.

Assuming that "prnCMYK" values and "targetLab" values in FIG. 2 corresponding to a colorimetry area "$x_i$, $y_i$", and "mesLab" values at a discrete time t are "$c_i$, $m_i$, $y_i$, $k_i$", "$\hat{L}_i$, $\hat{a}_i$, $\hat{b}_i$", and "$L^t_i$, $a^t_i$, $b^t_i$,", respectively, an evaluation function J for the colorimetric values is expressed by the following formula.

$$J = \sum_{i=1}^{N} \left\| \begin{pmatrix} L^t_i - \hat{L}_i \\ a^t_i - \hat{a}_i \\ b^t_i - \hat{b}_i \end{pmatrix} + D \begin{pmatrix} \delta^t_c(c_i) \\ \delta^t_m(m_i) \\ \delta^t_y(y_i) \\ \delta^t_k(k_i) \end{pmatrix} \right\|^2 + \quad \text{[Formula 1]}$$

$$\alpha \sum_{j=1}^{254} \left\| \begin{pmatrix} \delta^t_c(j-1) - 2\delta_c(j) + \delta_c(j+1) \\ \delta^t_m(j-1) - 2\delta_m(j) + \delta_m(j+1) \\ \delta^t_y(j-1) - 2\delta_y(j) + \delta_y(j+1) \\ \delta^t_k(j-1) - 2\delta_k(j) + \delta_k(j+1) \end{pmatrix} \right\|^2 +$$

$$\beta(\|\delta^t_c\|^2 + \|\delta^t_m\|^2 + \|\delta^t_y\|^2 + \|\delta^t_k\|^2)$$

Then, "$\delta^t_c$, $\delta^t_m$, $\delta^t_y$, $\delta^t_k$" that minimizes the evaluation function J as calculated above is determined to be the amount of TRC at the time t.

Note that the value of δ corresponding to the input values 0 and 255 is 0. Moreover, α and β are positive constants that are determined in advance based on experimental results to optimize the stability of a whole system, and D is a Jacobi matrix of a CMYK-to-Lab function formed by the colorimetric value prediction modeling unit 21. D is expressed by the following formula.

$$D = \begin{pmatrix} \frac{\delta L}{\delta c} & \frac{\delta L}{\delta m} & \frac{\delta L}{\delta y} & \frac{\delta L}{\delta k} \\ \frac{\delta a}{\delta c} & \frac{\delta a}{\delta m} & \frac{\delta a}{\delta y} & \frac{\delta a}{\delta k} \\ \frac{\delta b}{\delta c} & \frac{\delta b}{\delta m} & \frac{\delta b}{\delta y} & \frac{\delta b}{\delta k} \end{pmatrix}_{(c,m,y,k)} \quad \text{[Formula 2]}$$

In particular, when the color gamut of the scanner 27 is sufficient and it is not necessary for the scanner correction unit 25 to perform any correction, the Jacobi matrix D may be substituted with an array element closest to "$c_i$, $m_i$, $y_i$, $k_i$" of an implemented multidimensional look up table (LUT). Correction is not necessary, for example, when the color profile of the CMYK to Lab converter 13 is implemented by a multidimensional LUT where the input is CMYK and the output is Lab, as defined in the ICC profile (ISO 15076-1: 2005). In other cases, a Jacobi matrix D may easily be implemented by a multidimensional LUT of similar format and linear interpolation.

Next, the flare correction performed by the scanner correction unit 25 is described. In the present example embodiment, the scanner 27 of the image inspection unit 5 is implemented as an in-line sensor. More specifically, the printed-out paper passes over the fixed RGB line sensor. The scanner correction unit 25 has a table data of flare "blurriness function $\phi_c(x; i, j)$", which is measured in advance, as the flare characteristics of the scanner 27 that serves as a colorimeter of the image inspection unit 5.

The shape of this "blurriness function $\phi_c(x; i, j)$" is shaped like a mountain with steep sides, where the peak value is lower at the edge in the main-scanning direction and the widths to the sides are different from each other between the main-scanning direction and the sub-scanning direction.

In the blurriness function $\phi_c(x; i, j)$, the subscript c indicates r, g, and b that correspond to the RGB color channels. The subscript x indicates the sub-scanning direction of a target pixel, and the subscripts i (=−$N_i$ to $N_i$) and j (=1$N_j$ to $N_j$) indicate pixels in the main-scanning direction and sub-scanning direction. Modeling is done to obtain a contribution ratio of target pixel to be added to a pixel distant from a target pixel by (i, j), based on the results of the experiments performed in advance.

The scanner correction unit 25 incorporates $\phi_r(x; i, j)$, $\phi_g(x; i, j)$, and $\phi_b(x; i, j)$ into the input pixel values "r, g, b", respectively, that correspond to the main scanning position x, and thereby increases the influence of flare on a colorimetry image.

As described above, the blurriness function of flare is provided as a function of the position at which colorimetry is performed by a colorimeter unit and such a function is incorporated into a colorimetry image, and then a value of a colorimetry area is extracted. Accordingly, the correction of influence caused by flare, which requires a lot of memory and a long processing time, is stored in advance as a predicted value for output image, and real-time feedback is achieved while executing a print job.

As described above, the scanner correction unit 25 adds a colorimetric error made at the scanner 27 or the like due to the color arrangement on the input image data to a color specification value for the scanner 27 or the like, and thereby corrects a colorimetric value. Moreover, the scanner-color to Lab converter 15 converts the color specification value for the scanner 27 or the like that is generated by the Lab to scanner-color converter 14 and then is corrected by the scanner correction unit 25 into a color specification value again that is not dependent on the printer engine 4. Accordingly, the image data that is actually scanned by the scanner 27 or the like is simulated as a predicted value, and the matching between the color monitored by the scanner 27 or the like and the predicted target color can easily be checked.

According to the present example embodiment, a steady error unique to a colorimeter such as scanner or a measurement error dependent on the arrangement of colors in image data, in particular, a case in which the colors monitored by a colorimeter device deviate from the targeted predicted colors due to flare, can be avoided. Moreover, error correction can be performed precisely even when errors caused by a colorimeter are different from each other depending on the positions of the colorimeter, according to the present example embodiment described above. Accordingly, it becomes possible to perform precise feedback control with a simple colorimeter, and the cost of a device can be reduced.

<Second Embodiment>

Next, an image processing system according the second example embodiment of the present invention is described. Firstly, the background art of the present example embodiment is described. In the present the present example embodiment, an image processing unit, a printer engine, and a mechanism that corrects a colorimetric error are configured by software that operates in cooperation with an expansion board on a detached PC, which is different from the first example embodiment described above. By configuring an image processing unit in an independent manner, the load on the system configuration can be reduced as below.

The image processing apparatus according to the present example embodiment includes a raster image processor (RIP) that develops the print data into bit map data that is composed of primary colors used by a printing device. In digital printing systems that perform mass printing, image processing apparatuses are provided independently from the main printing device. This is because when the RIP is separately provided in the system, it becomes possible to select desired one of the RIPs provided by different developers using the same printing device.

In such cases, the load on the system increases significantly if the feedback control described above is performed for each of the RIPs provided by different developers. In order to deal with this problem, the image processing unit according to the present example embodiment is provided independently from the printer engine and the mechanism that corrects a colorimetric error. Accordingly, the image processing unit becomes free from the feedback control.

With the system configuration according to an example embodiment of the present invention described below, not only the load on the system configuration is reduced, but also the load on calibration can be reduced by the stabilization of the color reproduction including the consistency in a single printing process, printing at different sites, additional printing, or the like. Further, the feedback control according to the present example embodiment is not limited to TRC. Accordingly, the applicability of profiles for specific paper can be extended, and flexible profile management becomes possible.

An outline of the configuration of an image processing system 80 according to the present the present example embodiment is described below with reference to FIGS. 5 and 6. In the following description, matters common to the first example embodiment are omitted where appropriate, and differences from the first example embodiment will mainly be described.

The image processing system 80 according to the present example embodiment includes an image processing unit 81 and a main unit 82. The main unit 82 includes the printer engine 4, the engine controller 9, the image inspection unit 5, the engine controller 9, a color-tone controller 28, and a gradation processing unit 31. In the system configuration according to the present example embodiment, the image processing unit 81 is configured by software that operates in cooperation with an expansion board provided for a PC that is detached from the main unit 82, and the image processing unit 81 is replaceable from the main unit 82.

The image processing unit 81 includes a color space conversion unit that associates the color space of the input image data with the basic color space of the printer engine 4 based on a prescribed color reproduction characteristic description parameter of an output device. Moreover, the image processing unit 81 develops the input image data into pixels composed of the basic colors of the printer engine 4.

The image inspection unit 5 re-reads an image output from the printer engine 4 as electronic data. The image inspection unit 5 serves as an image inspection unit that detects variations in color tone from the image output from the printer engine 4. The gradation processing unit 31 converts the pixel arrangement developed by the image processing unit 81 into levels of gradation that can be output by the printer engine 4. The gradation processing unit 31 reduces the levels of gradation of pixels into levels of gradation that can be expressed by the printer engine 4, and the printer engine 4 forms the output image 6 on paper. The gradation processing unit 31 includes the gradation correction unit 16 that scales the density characteristics of the output image from the printer engine 4 based on a prescribed gradation correction parameter. Moreover, the gradation processing unit 31 corrects the color tone of two or more basic colors based on a color-tone correction parameter.

The color-tone controller 28 corrects the gradation correction parameter of the gradation correction unit 16 based on the comparison between the data read from the image inspection unit 5 and the pixel arrangement developed by the image processing unit 81. The color-tone controller 28 sends to the printer engine 4 the color-tone correction parameter that is determined according to the variations in color tone detected by the image inspection unit 5. The color-tone controller 28 detects, for example, variations in density or variations in hue as the variations in color tone from the image detected by the image inspection unit 5, and provides a correction parameter to the gradation processing unit 31.

The image processing unit 81 includes the Lab to CMYK converter 11 that serves as a color space conversion unit that associates the color space of the input image data with the basic color space of the printer engine 4 based on a prescribed color reproduction characteristic description parameter of an output device. Moreover, the image processing unit 81 includes a color profile used to extract a colorimetry area suitable for color difference determination from the input image data, and the memory 22 that serves as a colorimetry area holding unit that holds the colorimetry area extracted by an extraction unit.

Note that a color profile such as paper profile that is appropriately selected prior to printing operation is downloaded from the server 7, and is set to both the image processing unit 3 and the color-tone controller 28.

The image inspection unit 5 includes the scanner 27 that serves as a colorimeter that measures the colorimetric value of the image formed on a recording medium, in accordance with the colorimetry area stored in the memory 22. The image inspection unit 5 scans the output image from the printer engine 4, and corrects the parameters of the engine controller 9 and the gradation processing unit 31 so as to minimize deviation from a targeted color reproduction. Accordingly, the color reproduction of the output image is stabilized.

The color-tone controller 28 includes the CMYK to Lab converter 13 that serves as a color prediction unit that predicts the output colors of the printer engine 4 as a color specification value that is not dependent on the printer engine 4. Moreover, the color-tone controller 28 includes the scanner correction unit 25 that serves as a colorimetric error correction unit that corrects a colorimetric value by adding a colorimetric error made at the scanner 27 or the like due to the color arrangement on the input image data to the color specification value predicted by the CMYK to Lab converter 13.

The gradation processing unit 31 corrects a color-tone correction parameter so as to minimize according to a prescribed function an error between a color specification value and a colorimetric value regarding the colorimetry area stored in the memory 22. Here, the color specification value is obtained by converting the colorimetric value obtained by the scanner 27 into a color specification value that is not dependent on the printer engine 4, and the colorimetric value is obtained as a result of correction performed by the scanner correction unit 25 on the prnLab predicted by the CMYK to Lab converter 13.

Moreover, the gradation processing unit 31 includes a color-mixture correction unit 24 that corrects the ratio of color mixture of two or more basic colors based on a color-mixture correction parameter sent from the color-tone controller 28. The color-mixture correction parameter is determined by a color-tone correction determination unit 190.

Basically, the amount of TRC is determined in a similar manner to the first example embodiment described above, but the variations in the density of the solid-fills of CMYK basic colors detected by the color-tone correction determination unit 190 are corrected by controlling the printing conditions of the printer engine 4 such as developing bias and laser output using the engine controller 9.

Next, the color-mixture correction unit 24 is described in detail. The color-mixture correction unit 24 is a color conversion unit of CMYK inputs and CMYK outputs, and corrects color mixture according to the color-mixture correction parameter given from the color-tone correction determination unit 190 so as to stabilize the color reproduction of the final output image.

Next, how a color-mixture correction parameter to the color-mixture correction unit 24 is determined is described. The amount of correction performed by the color-mixture correction unit 24 is very small as the color-mixture correction unit 24 corrects only the variations in characteristics due to superimposition of color, which are residual errors of the correction performed by the gradation correction unit 16. Here, it is assumed that the color mixture is corrected by simple linear correction of the following formulas.

$$\begin{pmatrix} c' \\ m' \\ y' \\ k' \end{pmatrix} = (I + \lambda_1 \cdot M_1 + \lambda_2 \cdot M_2 + \lambda_3 \cdot M_3) \begin{pmatrix} c \\ m \\ y \\ k \end{pmatrix}$$

$$\| t(\hat{L}_i, \hat{a}_i, \hat{b}_i) - \psi \cdot (M \cdot {}^t(c_i, m_i, y_i, k_i)) \|$$

Here, Mj(j=1, 2, 3) on the right side of the formula (3) is a 4*4 real matrix that achieves best-fitted approximation of the empirically-prescribed flexibility of variations due to color mixture, and $\lambda i$ is a real number that serves as a color-mixture correction parameter. Also for the color-mixture correction parameter, a color-mixture correction parameter $\lambda i(i=1, 2, 3)$ that minimizes (i=1, 2, . . . , N) is determined based on the TRC determined by algorithm similar to that of the first example embodiment described above.

Note that in order for the correction described above to be effective, it is desired that the residual error approximated by the gradation correction unit 16 in a subsequent stage, for example, the residual errors of one-color correction, be sufficiently linearized. In order to achieve such linearization, gradation characteristics may be incorporated into the gradation correction parameter of the gradation correction unit 16 in advance such that the approximated residual error is linearized. The number of the color-mixture correction parameters is three in the example embodiment described above, but a larger number of parameters may be used to achieve similar results.

When the residual errors of one-color correction indicate strong nonlinearity and it is difficult to achieve sufficient precision of color-mixture correction with the approximated linearity, piecewise correction in which approximated parameters are switched within the range of the values of c, m, y, and k, or color-mixture correction using a multidimensional LUT may be performed.

The correction of variations in cycles of density in the sub-scanning direction is described with reference to FIG. 5. In the present example embodiment, the color-tone controller 28 calculates a color-tone correction parameter based on the synchronous signals of the rotating parts of the printer engine 4.

Figure 3:
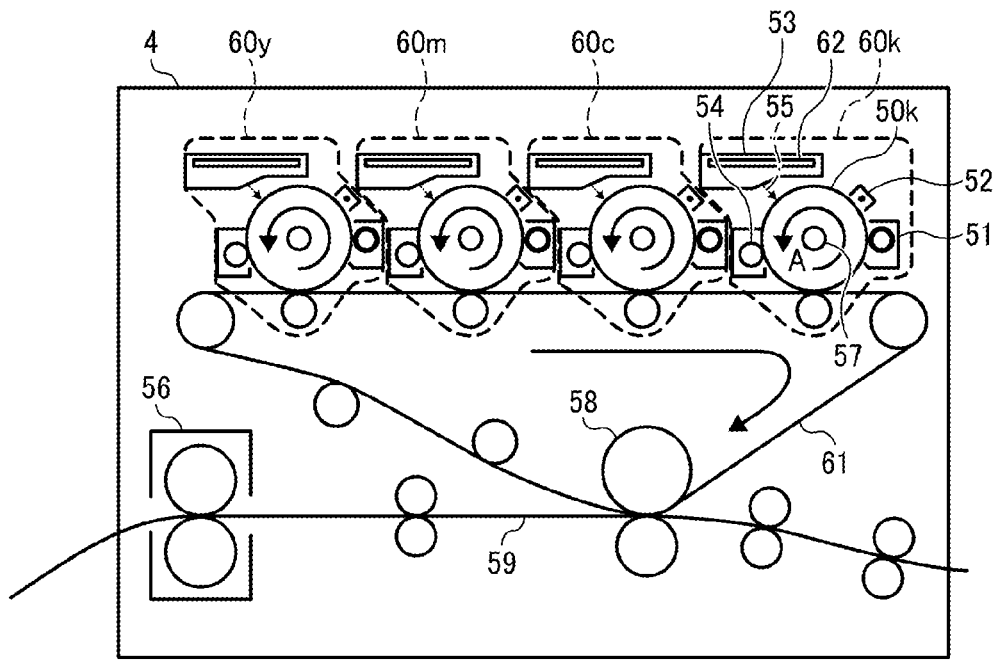
FIG. 3 is a schematic diagram illustrating the configuration of a laser printer according to an example embodiment of the present invention.

With the developing unit 60k of FIG. 3 according to the first example embodiment as an example, even when the photoreceptor drum 50k has very slight decentering, variations in cycles of printing density, for example, uneven printing, occur in synchronization with the rotational cycles of the decentered photoreceptor drum 50k. When such uneven printing is present, variations in density among pages are not accurately detected in some cases in relation to the sampling processes of colorimetry areas.

Figure 7:
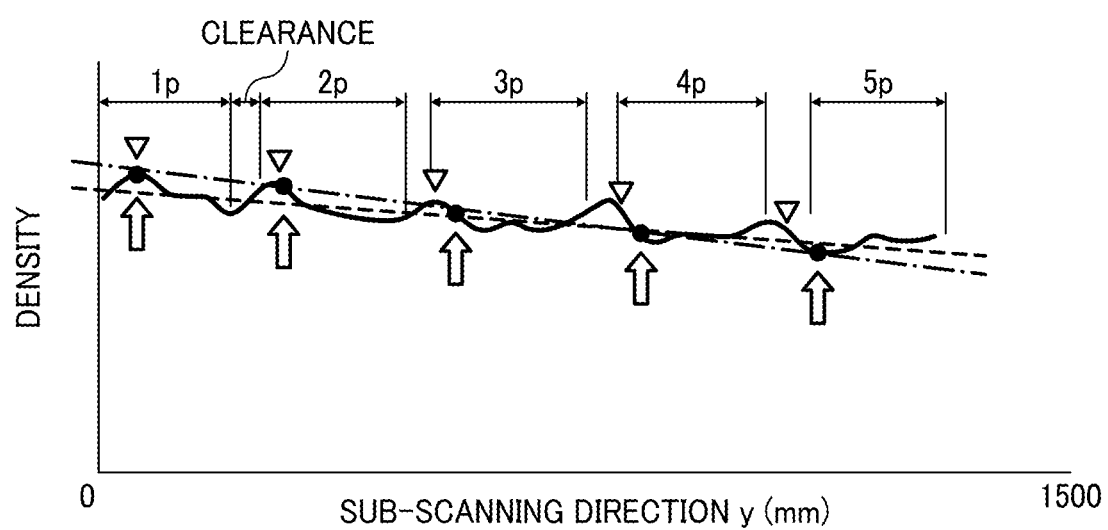
FIG. 7 is a graph illustrating the correction of variations in cycles of density according to a second example embodiment of the present invention.

Such cases are described below with reference to FIG. 7. FIG. 7 illustrates the sub-scanning positions of the printing output of five pages in the lateral axis with a single coordinate axis, where the printing area of the first page is set to the beginning point and the clearance that is not actually printed is included. The longitudinal axis indicates the density.

The characteristics of the variations in density in the sub-scanning direction include the periodical changes indicated by the solid line over the gradual density drift among pages indicted by broken lines, and random variations superposed thereon. Such periodical changes ranging from a few centimeters to a few tens of centimeters often occur in synchronization with the photoreceptor drum 50k and the development roller 54.

Figure 5:
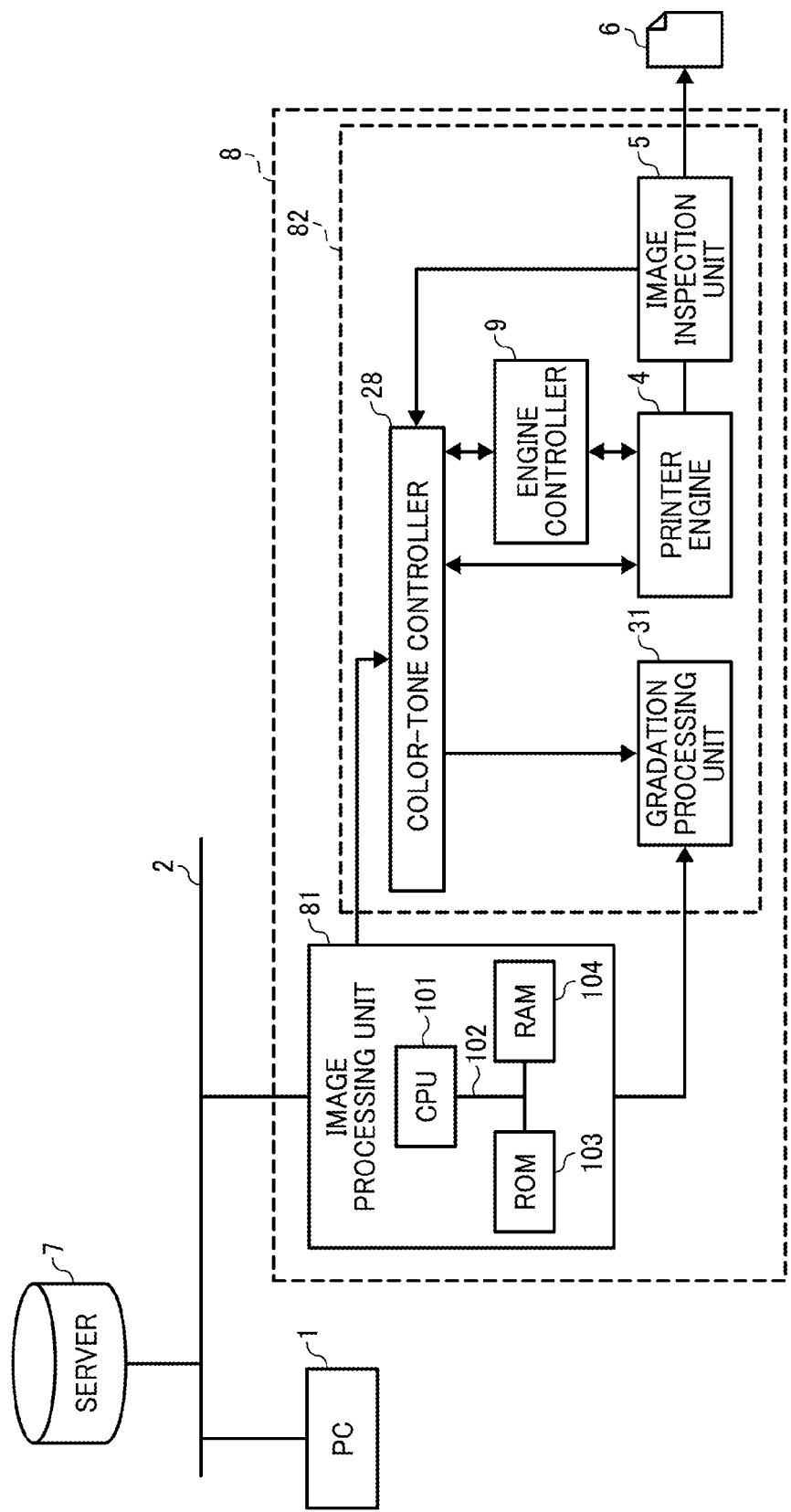
FIG. 5 is a schematic diagram illustrating the configuration of an image processing system according to a second example embodiment of the present invention.
Figure 6:
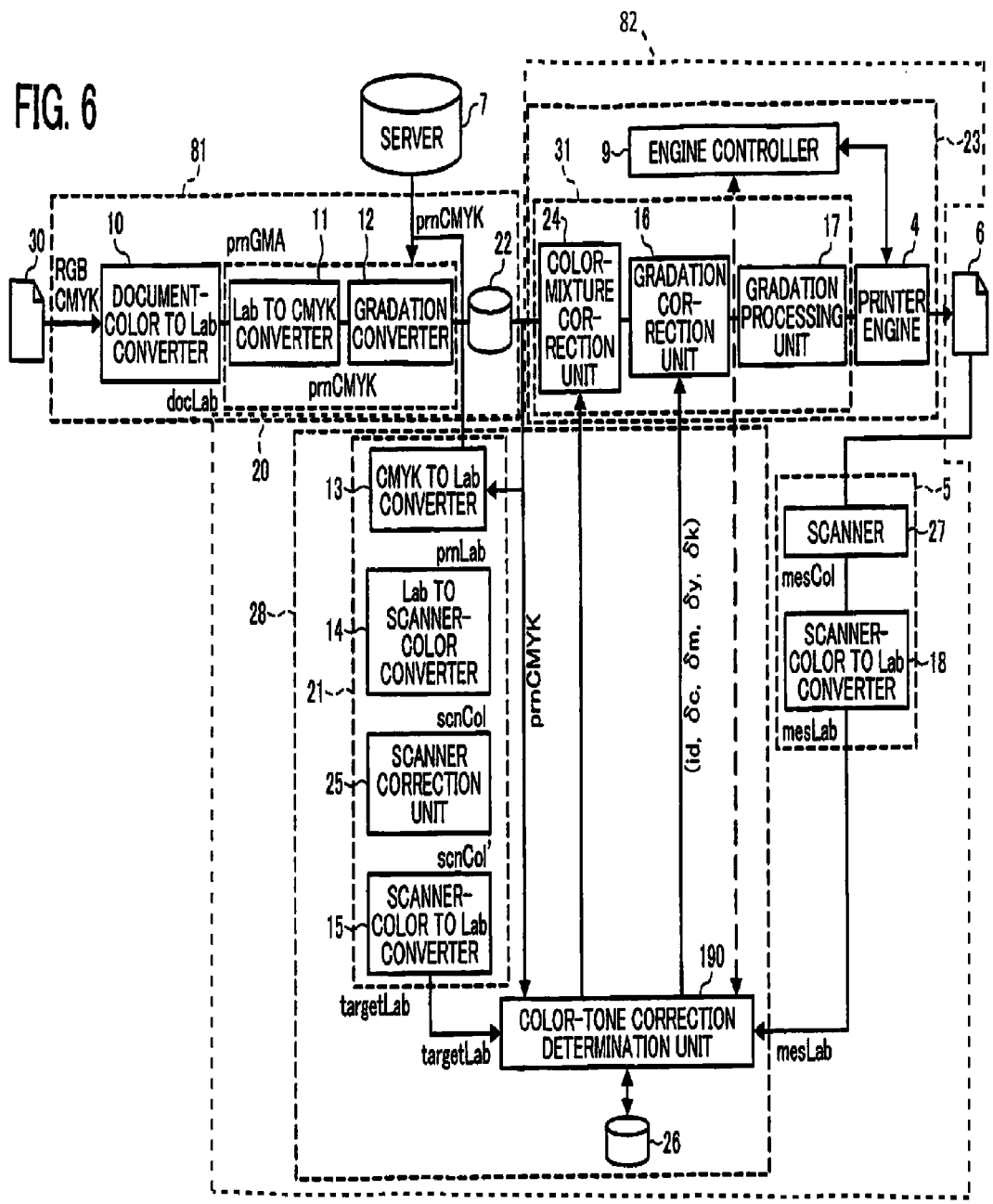
FIG. 6 is a schematic diagram illustrating the flow of image data processing according to a second example embodiment of the present invention.

As illustrated in FIG. 5, the cycles of the variations in density indicated by triangles are slightly misaligned from the cycles of sampling processes indicated by upward-pointing arrows. For this reason, the amount of drift indicated by alternate long and short dashed lines estimated from the colorimetric value indicated by black dots are excessively evaluated than the actual amount of drift indicated by broken lines.

In order to avoid such excessive evaluation, the amplitude of the most-influencing periodical changes in the printer engine 4, for example, the amplitude of the periodical changes of a photoreceptor drum, is obtained in advance in the present example embodiment. Then, errors in the periodical changes may be corrected in the comparison of color difference performed at the color-tone correction determination unit 190, based on the synchronous signals sent from the rotation detector 57 provided at an edge of the photoreceptor drum 50k.

An image processing apparatus comprises: an image forming unit configured to form a color image on a recording medium by superimposing two or more basic colors on top of one another based on input image data; a color space processing unit configured to associate color space of the input image data with a basic color space of the image forming unit; a gradation correction unit configured to correct gradation characteristics of the two or more basic colors based on a gradation correction parameter; a color prediction unit configured to predict an output color of the image forming unit as a color specification value independent from the image forming unit; an extraction unit configured to extract from the input image data a colorimetry area for color difference determination; a colorimetry area holding unit configured to hold the colorimetry area extracted by the extraction unit; a colorimeter configured to measure a colorimetric value of an area of an output image formed on the recording medium, the area corresponding to the colorimetry area held by colorimetry area holding unit; and a colorimetric error correction unit configured to add a colorimetric error made at the colorimeter due to a color arrangement on the input image data to the color specification value predicted by the color prediction unit, to correct the colorimetric value, wherein the gradation correction unit corrects a gradation correction parameter to minimize, according to a prescribed function, an error regarding at least some of the colorimetry area stored in the colorimetry area holding unit between the colorimetric value obtained by the colorimetric error correction unit and a color specification value obtained by converting the colorimetric value obtained by the colorimeter into a color specification value independent from the image forming unit.

The image processing apparatus further comprises: a colorimetric value converter configured to convert a color specification value for the colorimeter into a color specification value independent from the image forming unit; and a colorimetric value inverter configured to invert the color specification value independent from the image forming unit to obtain a color specification value for the colorimeter, wherein the colorimetric error correction unit adds a colorimetric error made at the colorimeter due to a color arrangement on the input image data to the color specification value for the colorimeter obtained by the colorimetric value inverter, and thereby corrects the colorimetric value, and the colorimetric value converter converts the color specification value for the colorimeter corrected by the colorimetric-error correction unit into a color specification value independent from the image forming unit.

In the image processing apparatus, the colorimetric-error correction unit derives a colorimetric error made by the colorimeter depending on a level of influence of flare on the recording medium caused by reflection of light illuminated by the colorimeter.

In the image processing apparatus, the colorimetric-error correction unit derives a colorimetric error based on a function of flare and includes the derived colorimetric error in a color specification value for the colorimeter, to correct the color specification value.

A method of processing an image comprises: forming a color image on a recording medium by superimposing two or more basic colors on top of one another based on input image data; associating color space of the input image data with a basic color space of the forming; correcting gradation characteristics of the two or more basic colors based on a gradation correction parameter; predicting an output color of the forming as a color specification value independent from a device forming a color image; extracting from the input image data a colorimetry area suitable for color difference determination; holding the extracted colorimetry area in a storage unit; measuring a colorimetric value of an area of the color image formed on a recording medium, the area corresponding to the colorimetry area held in the storage unit; and adding a colorimetric error made in the measuring due to a color arrangement on the input image data to the predicted color specification value, and thereby correcting the colorimetric value, wherein a gradation correction parameter is corrected to minimize, according to a prescribed function, an error regarding at least some of the colorimetry area stored in the storage unit between the corrected colorimetric value and a color specification value obtained by converting the measured colorimetric value into a color specification value independent from the device.

A computer-readable non-transitory recording medium stores a program for causing a computer to execute a method, and the method comprises: forming a color image on a recording medium by superimposing two or more basic colors on top of one another based on input image data; associating color space of the input image data with a basic color space of the forming; correcting gradation characteristics of the two or more basic colors based on a gradation correction parameter; predicting an output color of the forming as a color specification value independent from a device forming a color image; extracting from the input image data a colorimetry area suitable for color difference determination; holding the extracted colorimetry area in a storage unit; measuring a colorimetric value of an area of an output image formed on a recording medium, the area corresponding to the colorimetry area held in the storage unit; and adding a colorimetric error made in the measuring due to a color arrangement on the input image data to the predicted color specification value, and thereby correcting the colorimetric value, wherein the correcting corrects a gradation correction parameter to minimize, according to a prescribed function, an error regarding at least some of the colorimetry area stored in the storage unit between the corrected colorimetric value and a color specification value obtained by converting the measured colorimetric value into a color specification value independent from the device.

An image processing system comprises: an image forming unit configured to form an output image on a recording medium by superimposing two or more basic colors on top of one another based on input image data; an image processing unit including a color space conversion unit configured to associate color space of the input image data with basic color space of the image forming unit based on a prescribed color reproduction characteristic description parameter of an output device, the image processing unit developing the input image data into pixels composed of basic colors of the image forming unit; a gradation processing unit configured to reduce levels of gradation of the pixels from the image processing unit into levels of gradation expressed by the image forming unit; the gradation processing unit including a gradation correction unit configured to scale density characteristics of the output image from the image forming unit based on a prescribed gradation correction parameter; an image inspection unit configured to re-reads an image output from the image forming unit as electronic data; and a color-tone controller configured to correct a gradation correction parameter of the gradation correction unit based on a comparison between the read data from the image inspection unit and the pixel arrangement developed by the image processing unit, wherein the gradation processing unit and the color-tone controller are independent from the image processing unit.

In the image processing system, the gradation processing unit and the color-tone controller are configured in a housing different from that of the image processing unit.

In the image processing system, the gradation processing unit includes a color-mixture correction unit configured to correct a ratio of color mixture of the two or more basic colors based on a gradation correction parameter sent from the color-tone controller.

In the image processing system, the color-tone controller calculates a color-tone correction parameter based on the synchronous signals of the rotating parts of the image forming unit.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Note that the embodiments described above are preferred example embodiments of the present invention, and various applications and modifications may be made without departing from the scope of the invention. Further, any of the above-described processes performed by the image processing apparatus according to the present example embodiment can be implemented as a hardware apparatus, such as a special-purpose circuit or device, or as a hardware/software combination, such as a processor executing a software program.

Each of the functions of the described embodiments may be implemented by one or more processing circuits or circuitry. Processing circuitry includes a programmed processor, as a processor includes circuitry. A processing circuit also includes devices such as an ASIC and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a CPU, a RAM, and a HDD. The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image processing apparatus comprising:
a colorimeter configured to obtain a colorimetric value of an area of a color image;
a memory having computer readable instructions stored thereon;
at least one processor configured to execute the computer readable instructions to,
obtain the color image output from an image forming unit, the color image being formed by superimposing two or more basic colors on top of one another based on input image data,
correct gradation characteristics of the two or more basic colors to be used by the image forming unit based on a gradation correction parameter,
predict an output color of the image forming unit to generate a predicted color specification value,
extract from the input image data a colorimetry area for color difference determination,
obtain a colorimetric value from the colorimeter of an area of the color image that corresponds to the extracted colorimetry area,
add a reading error that is introduced by the colorimeter to the input image data during the obtaining of the colorimetric value by the colorimeter to the predicted color specification value, to obtain a corrected obtained colorimetric value of the area of the color image,
correct the gradation correction parameter to minimize, according to a desired correction function, a difference for at least a portion of the colorimetry area between the corrected obtained colorimetric value and a detected color specification value obtained using the colorimeter, and
derive a second reading error based on the desired correction function, the desired correction function corresponding to a flare correction function, and includes the derived second reading error in a color specification value for the colorimeter, to correct the predicted color specification value.

2. The image processing apparatus according to claim 1, wherein the at least one processor is further configured to:
convert the detected color specification value obtained using the colorimeter into an independent color specification value, the independent color specification value being independent from the image forming unit;
invert the independent color specification value to obtain an inverted color specification value for the colorimeter;
add the second reading error to the inverted color specification value, and thereby correct the colorimetric value; and
convert the corrected inverted color specification value into the independent color specification value.

3. The image processing apparatus according to claim 2, wherein the at least one processor is further configured to derive the second reading error by deriving a flare reading error caused by the colorimeter that is dependent upon a detected level of flare on a recording medium, the flare caused by reflection of light illuminated by the colorimeter off of the recording medium.

4. The image processing apparatus according to claim 1, further comprising:
the image forming unit, the image forming unit configured to form the color image on the memory by superimposing two or more basic colors on top of one another based on the input image data.

5. The image processing apparatus according to claim 1, further comprising:
an expansion board device including configuration software, the expansion board configured to configure the at least one processor according to the configuration software.

6. The image processing apparatus according to claim 1, wherein the at least one processor is further configured to derive a third reading error based on the desired correction function, the desired correction function corresponding to a change in at least one characteristic of the image forming device, and includes the derived second reading error in the corrected color specification value for the colorimeter, to correct the predicted color specification value.

7. The image processing apparatus according to claim 1, wherein the predicted color specification value is independent from the image forming unit.

8. A method of processing an image, the method comprising:
obtaining, using at least one processor, a color image output from an image forming unit, the color image being formed by superimposing two or more basic colors on top of one another based on input image data, using a colorimeter;
correcting, using the at least one processor, gradation characteristics of the two or more basic colors to be used by the image forming unit based on a gradation correction parameter;
predicting, using the at least one processor, an output color of the image forming unit to generate a predicted color specification value;
extracting, using the at least one processor, from the input image data a colorimetry area for color difference determination;
obtaining, using the at least one processor, a colorimetric value of an area of the color image that corresponds to the extracted colorimetry area, using the colorimeter; and
adding, using the at least one processor, a reading error that is introduced by the colorimeter to the input image data during the obtaining of the colorimetric value by the colorimeter to the predicted color specification value, to obtain a corrected colorimetric value of the area of the color image, and
wherein the correcting includes,
correcting the gradation correction parameter to minimize, according to a desired correction function, a difference for at least a portion of the colorimetry area between the corrected obtained colorimetric value and a detected color specification value obtained using the colorimeter, and
deriving a second reading error based on the desired correction function, the desired correction function corresponding to a flare correction function, and including the derived second reading error in a color specification value for the colorimeter, to correct the predicted color specification value.

9. The method according to claim 8, further comprising:
converting, using the at least one processor, the detected color specification value for measuring into an independent color specification value, the independent color specification value being from the image forming unit;
inverting, using the at least one processor, the independent color specification value obtain an inverted color specification value for the colorimeter;
adding, using the at least one processor, the second reading error to the inverted color specification value, and thereby correct the colorimetric value; and
converting, using the at least one processor, the corrected inverted color specification value into the independent color specification value.

10. The method according to claim 8, wherein the correcting includes deriving, using the at least one processor, the second reading by deriving a flare reading error caused by the colorimeter that is dependent upon a detected level of flare on a recording medium, the flare caused by reflection of light illuminated by the colorimeter off of the recording medium.

11. The method according to claim 8, further comprising:
configuring the at least one processor using an expansion board device according to configuration software included on the expansion board.

12. The method according to claim 8, wherein the correcting includes deriving, using the at least one processor, a third reading error based on the desired correction function, the desired correction function corresponding to a change in at least one characteristic of the image forming device, and including the derived second reading error in the corrected color specification value for measuring, to correct the predicted color specification value.

13. A non-transitory computer-readable recording medium storing a program for causing at least one processor to execute a method, the method comprising:
obtaining, using the at least one processor, a color image output from an image forming unit, the color image being formed by superimposing two or more basic colors on top of one another based on input image data, using a colorimeter;
correcting, using the at least one processor, gradation characteristics of the two or more basic colors to be used by the image forming unit based on a gradation correction parameter;
predicting, using the at least one processor, an output color of the image forming unit to generate a predicted color specification value;
extracting, using the at least one processor, from the input image data a colorimetry area for color difference determination;
obtaining, using the at least one processor, a colorimetric value of an area of the color image that corresponds to the extracted colorimetry area, using the colorimeter; and
adding, using the at least one processor, a reading error that is introduced by the colorimeter to the input image data during the obtaining of the colorimetric value by the colorimeter to the predicted color specification value, to obtain a corrected obtained colorimetric value of the area of the color image;
wherein the correcting includes,
correcting the gradation correction parameter to minimize, according to a desired correction function, a difference for at least a portion of the colorimetry area between the corrected obtained colorimetric value and a detected color specification value obtained using the colorimeter, and deriving, using the at least one processor, a second reading error based on the desired correction function, the desired correction function corresponding to a flare correction function, and including the derived second reading error in the corrected obtained color value, to correct the predicted color specification value.

14. The non-transitory computer-readable recording medium according to claim 13, the method further comprising:
converting, using the at least one processor, the detected color specification value obtained using the colorimeter into an independent color specification value, the independent color specification value being independent from the image forming unit; and
inverting, using the at least one processor, the independent color specification value to obtain an inverted color specification value for the colorimeter,
wherein
the correcting the obtained colorimetric value includes adding the second reading error made due to the obtained color specification value, and thereby correcting the colorimetric value, and
the converting includes converting the corrected color specification value into the independent color specification value.

15. The non-transitory computer-readable recording medium according to claim 14, wherein the correcting includes deriving, using the at least one processor, the second reading error by deriving a flare reading error caused by the colorimeter that is dependent upon a detected level of flare on a recording medium, the flare caused by reflection of light illuminated by the colorimeter off of the recording medium.

16. The non-transitory computer-readable recording medium according to claim 13, the method further comprising:
configuring the at least one processor using an expansion board device according to configuration software included on the expansion board.

17. The non-transitory computer-readable recording medium according to claim 13, wherein the correcting includes deriving, using the at least one processor, a third reading error based on the desired correction function, the desired correction function corresponding to a change in at least one characteristic of the image forming device, and including the derived second reading error in the corrected color specification value, to correct the predicted color specification value.

* * * * *